United States Patent
Simon et al.

(10) Patent No.: US 12,073,995 B2
(45) Date of Patent: Aug. 27, 2024

(54) CAPACITOR ASSEMBLY, METHOD FOR PRODUCTION THEREOF AND CONVERTER ASSEMBLY CONTAINING THE CAPACITOR ASSEMBLY

(71) Applicant: Siemens Energy Global GmbH Co. KG, Munich (DE)

(72) Inventors: Torsten Harald Simon, Hoechstadt a. d. Aisch (DE); Stefan Stingl, Nuremberg (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 219 days.

(21) Appl. No.: 17/540,618

(22) Filed: Dec. 2, 2021

(65) Prior Publication Data
US 2022/0172890 A1    Jun. 2, 2022

(30) Foreign Application Priority Data
Dec. 2, 2020 (EP) .................................. 20211194

(51) Int. Cl.
*H01G 4/224* (2006.01)
*H01G 2/10* (2006.01)
*H01G 4/02* (2006.01)
*H01G 4/38* (2006.01)
(Continued)

(52) U.S. Cl.
CPC .............. *H01G 2/106* (2013.01); *H01G 2/10* (2013.01); *H01G 4/02* (2013.01); *H01G 4/224* (2013.01); *H01G 4/38* (2013.01); *H01G 13/003* (2013.01); *H02M 7/515* (2013.01); *H01G 2/103* (2013.01)

(58) Field of Classification Search
CPC .......... H01G 2/106; H01G 2/10; H01G 2/103; H01G 4/02; H01G 4/38; H01G 4/224; H01G 13/003; H02M 7/515
See application file for complete search history.

(56) References Cited

U.S. PATENT DOCUMENTS

| 3,731,130 A * | 5/1973 | Dutta ..................... H01G 4/224 29/25.42 |
| 4,639,827 A * | 1/1987 | Strange ................... H01G 4/38 361/272 |
| 2014/0286064 A1 | 9/2014 | Kamizuma et al. |

(Continued)

FOREIGN PATENT DOCUMENTS

| DE | 102013203614 A1 * | 8/2014 | .............. H01G 2/10 |
| DE | 102015218888 A1 * | 3/2017 | |

(Continued)

OTHER PUBLICATIONS

Search Report and Written Opinion from the European Patent Office, Apr. 29, 2021.

*Primary Examiner* — Thienvu V Tran
*Assistant Examiner* — Shahzeb K Ahmad
(74) *Attorney, Agent, or Firm* — Laurence A. Greenberg; Werner H. Stemer; Ralph E. Locher

(57) ABSTRACT

A capacitor assembly, configured for a high-voltage application, contains an active capacitor part, a housing for accommodating the active capacitor part and an insulating medium for the electrical insulation of the active capacitor part. A flexible-shape inlay is arranged between the insulating medium and the housing and connected electrically thereto. Ideally the capacitor assembly is part of a converter assembly.

15 Claims, 2 Drawing Sheets

(51) Int. Cl.
*H01G 13/00* (2013.01)
*H02M 7/515* (2007.01)

(56) References Cited

U.S. PATENT DOCUMENTS

| | | | | |
|---|---|---|---|---|
| 2015/0144618 | A1* | 5/2015 | Jeanneteau | H05K 1/115 |
| | | | | 361/301.3 |
| 2016/0268921 | A1* | 9/2016 | Feuerstack | H05K 7/14329 |
| 2017/0110252 | A1* | 4/2017 | Stockman | H01G 4/224 |
| 2018/0033558 | A1* | 2/2018 | Jakoubovitch | H01G 4/38 |
| 2020/0357572 | A1* | 11/2020 | Takeya | H01G 2/106 |
| 2021/0249191 | A1* | 8/2021 | Kodachi | H01G 4/236 |

FOREIGN PATENT DOCUMENTS

| | | |
|---|---|---|
| EP | 3104486 A1 | 12/2016 |
| JP | 2010086744 A | 4/2010 |
| WO | WO 2014207734 A1 | 12/2014 |
| WO | WO 2016076452 A1 | 5/2016 |

\* cited by examiner

CAPACITOR ASSEMBLY, METHOD FOR PRODUCTION THEREOF AND CONVERTER ASSEMBLY CONTAINING THE CAPACITOR ASSEMBLY

CROSS-REFERENCE TO RELATED APPLICATION

This application claims the priority, under 35 U.S.C. § 119, of European Patent Application EP 20211194, filed Dec. 2, 2020; the prior application is herewith incorporated by reference in its entirety.

FIELD AND BACKGROUND OF THE INVENTION

The invention relates to a capacitor assembly, designed for a high voltage application (generally >1 kV), containing an active capacitor part, a housing for accommodating the active capacitor part and an insulating medium between the housing and the active capacitor part for the electrical insulation of the active capacitor part.

Known capacitor assemblies of this type contain SF6-insulated capacitors. These capacitors normally use the gas sulfur hexafluoride (SF6) as a dielectric, for example with a gas pressure of 300 to 700 kPa. Alternatively, the insulating medium can contain an insulating oil or an insulating resin. The active capacitor part can be built up, for example, in the form of wound films contacted at the end faces. The housing can be a round cup made of a conductive material, preferably metallic, preferably of aluminum.

SUMMARY OF THE INVENTION

The object of the invention is to propose a capacitor assembly of the generic type which is as reliable as possible.

According to the invention, in a capacitor assembly of the generic type, the object is achieved by an in particular flexible-shape inlay, which is arranged between the insulating medium and the housing and connected electrically thereto. The invention advantageously makes it possible to provide SF6-free or oil-free, relatively environmentally friendly capacitor assemblies. The insulating medium of the capacitor assembly according to the invention can accordingly be, for example, an insulating compound which encloses the active capacitor part at least partly, preferably completely.

According to our own investigations, specific environmental influences during the operation of the capacitor assembly, in particular temperature changes or vibrations, can effect detachment of the insulating medium from the housing. Because of the detachment, interspaces can be produced between the insulating medium and the housing, which can lead to impairment of the dielectric properties of the capacitor assembly and in particular to partial discharges during the operation of the capacitor assembly. The inlay between the housing and the insulating medium advantageously permits the risk of such partial discharges to be lowered and, in this way, the reliability of the capacitor assembly to be increased. The inlay preferably enters into a (e.g. chemical) connection with the insulating medium (e.g. the insulating compound or insulating potting). The inlay is suitably so flexible that the inlay is not detached from the insulating medium by environmentally induced loadings. Expediently, the inlay is thermally stable (heat-resistant) in a temperature range from −40° C. to 70° C. The inlay is expediently conductively and electrically connected to the housing so that, during the operation of the capacitor assembly, there is no potential difference relative to the housing (the inlay and the housing are at the same electric potential). Because of the connection to the insulating medium, a homogenous voltage distribution between the inlay and the active capacitor part is ensured. This reduces the probability of a partial discharge.

According to one implementation, the housing and the inlay at least partly rest on each other. For example, the housing and the inlay can be cylindrical, wherein the inlay is a tube, a flexible tube or an appropriately shaped band or film (tubular and under some circumstances arranged or inserted with an overlap), which is inserted into the housing, resting on the interior of the housing, before the capacitor assembly is put into service (e.g. during its production). The assembly with a cylindrical geometry is relatively simple and reduces the risk of production-induced air inclusions.

The insulating medium preferably contains a potting compound made of a resin, that is to say, for example, a partially liquid or not completely cured resin. Such an insulating medium firstly has excellent dielectric properties and secondly good shape flexibility, which is able to fill the entire space between the active capacitor part and inlay. In this embodiment, the insulating medium is SF6-free and/or oil-free. Preferably, the inlay is capable of bonding with the potting compound (in particular capable of chemical bonding). If the inlay enters into a chemical bond with the potting compound, then the probability of the production of interspaces between the inlay and the potting compound is further reduced.

Preferably, the inlay has a thickness of less than 2 mm. In particular, the inlay can be a film. In this way, the influence of the film on the total insulation resistance of the assembly is relatively small. In addition, the film can relatively simply be equipped with the necessary shape flexibility by the material of the film being selected suitably. In this connection, it is viewed as particularly preferred if the inlay is conductive, in particular a metallically coated polypropylene film. In particular a film made of polypropylene which has a complete metal coating on (at least) one side is suitable. The thin inlay shrinks with the insulating medium (for example potting compound), for example during a temperature change.

The inlay is suitably connected to the housing by an electrical attachment, wherein the attachment preferably contains rivets, screws and/or an electric cable. According to a particularly simple embodiment, the inlay can be connected to the housing by an attachment which, at the same time, also serves for an electrical connection of the active capacitor part to the housing (e.g. a corresponding screw or the like which, however, can also be achieved, for example, by suitable pressing of the insulating compound).

According to one embodiment of the invention, the active capacitor part contains an electric series circuit of partial capacitors (e.g. partial windings). Accordingly, the entire series circuit is accommodated jointly in the housing. In this way, a particularly inexpensive and at the same time reliable capacitor assembly is provided.

Expediently, the capacitor assembly has a voltage resistance of at least 1 kV, preferably at least 10 kV insulation voltage. At the aforementioned high voltage resistances, the advantages of the invention apply to a particular extent, since the risk of partial discharges is otherwise especially high at such voltages.

The invention further relates to a method for producing a capacitor assembly.

The object of the invention is to propose such a method which permits the simple production of a particularly reliable capacitor assembly.

According to the invention, in a method of the generic type, the object is achieved in that, before filling a housing with an electrically insulating potting compound, a flexible-shape inlay is arranged to rest on an inner wall of the housing and is connected electrically to the housing.

The advantages of the method according to the invention result in particular from the advantages which have already been explained in connection with the capacitor assembly according to the invention.

The insulating potting compound can be, for example, a resin which, during the operation of the capacitor assembly produced, remains partially liquid or not completely cured. Before the filling of the housing with the potting compound, an active capacitor part is suitably introduced into the housing and connected to external terminals of the capacitor assembly.

The invention further relates to a converter assembly having a series circuit of power semiconductors.

Such a converter assembly can, for example, comprise converter arms which each extend between a DC pole (or DC terminal) and an AC terminal of the converter assembly, so that the converter assembly can, for example, be switched between a DC network and an AC network. A series circuit of switching units can be arranged in each converter arm. For example, each switching unit can have at least one thyristor (or else a series circuit of thyristors). In such a case, this can therefore be a so-called line-commutated converter assembly.

The object of the invention is to specify a converter assembly of the generic type which is as reliable as possible.

According to the invention, in a converter assembly of the generic type, the object is achieved in that a capacitor assembly according to the invention is arranged in an electric parallel branch to at least one of the power semiconductors.

The advantages of the converter assembly according to the invention result in particular from the advantages of the capacitor assembly according to the invention. The capacitor assembly is suitably used as a snubber capacitor or part of a snubber element which contains a series circuit of the capacitor assembly and a resistor. In this application, the capacitor assembly is used in particular to damp voltage peaks on the power semiconductors and therefore to increase the reliability of the overall converter assembly.

The invention will be explained further below by using exemplary embodiments illustrated in FIGS. 1 and 2.

Other features which are considered as characteristic for the invention are set forth in the appended claims.

Although the invention is illustrated and described herein as embodied in a capacitor assembly, a method for production thereof and a converter assembly containing the capacitor assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
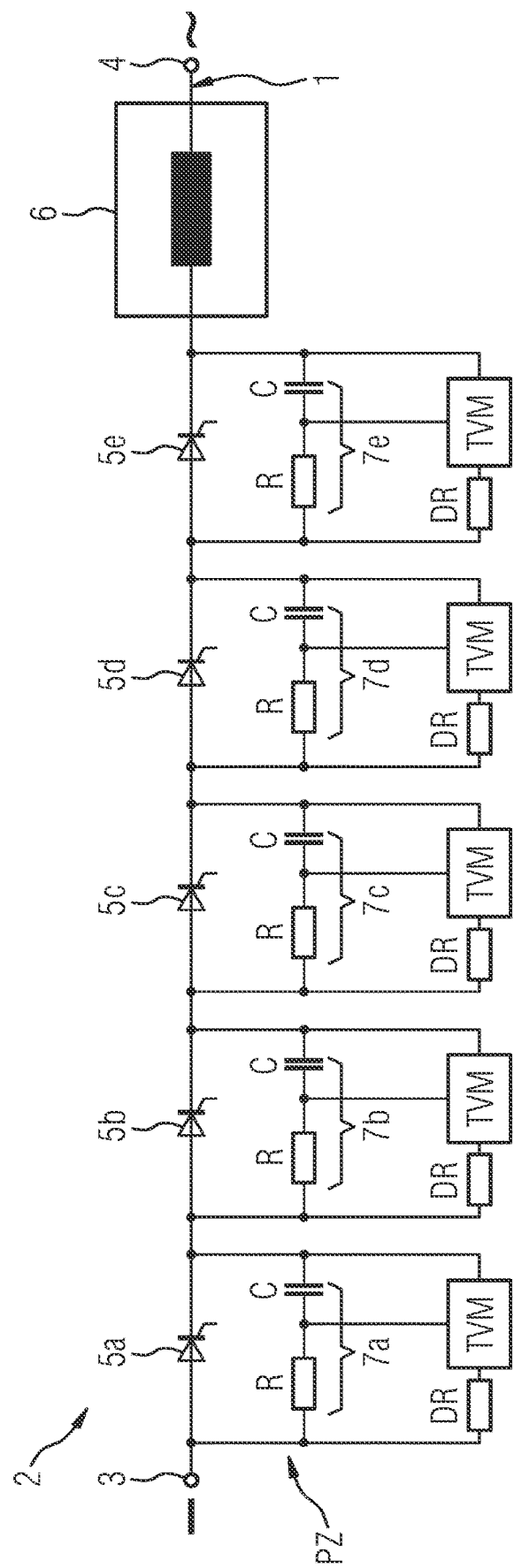
FIG. 1 is a diagrammatic illustration of a converter assembly according to the invention.

Referring now to the figures of the drawings in detail and first, particularly to FIG. 1 thereof, there is shown a valve or valve section 1 of a converter assembly 2 which extends between a DC terminal 3 and an AC terminal 4. The valve 1 contains thyristors 5a-5e, which are arranged in series with one another. The valve 1 further contains an inductor 6.

In an electric parallel branch PZ to each of the thyristors 5a-e, a respective snubber element 7a-e made of a resistor R and a capacitor assembly C is provided. Each capacitor assembly C is also assigned a monitoring unit TVM having a voltage divider DR.

Figure 2:
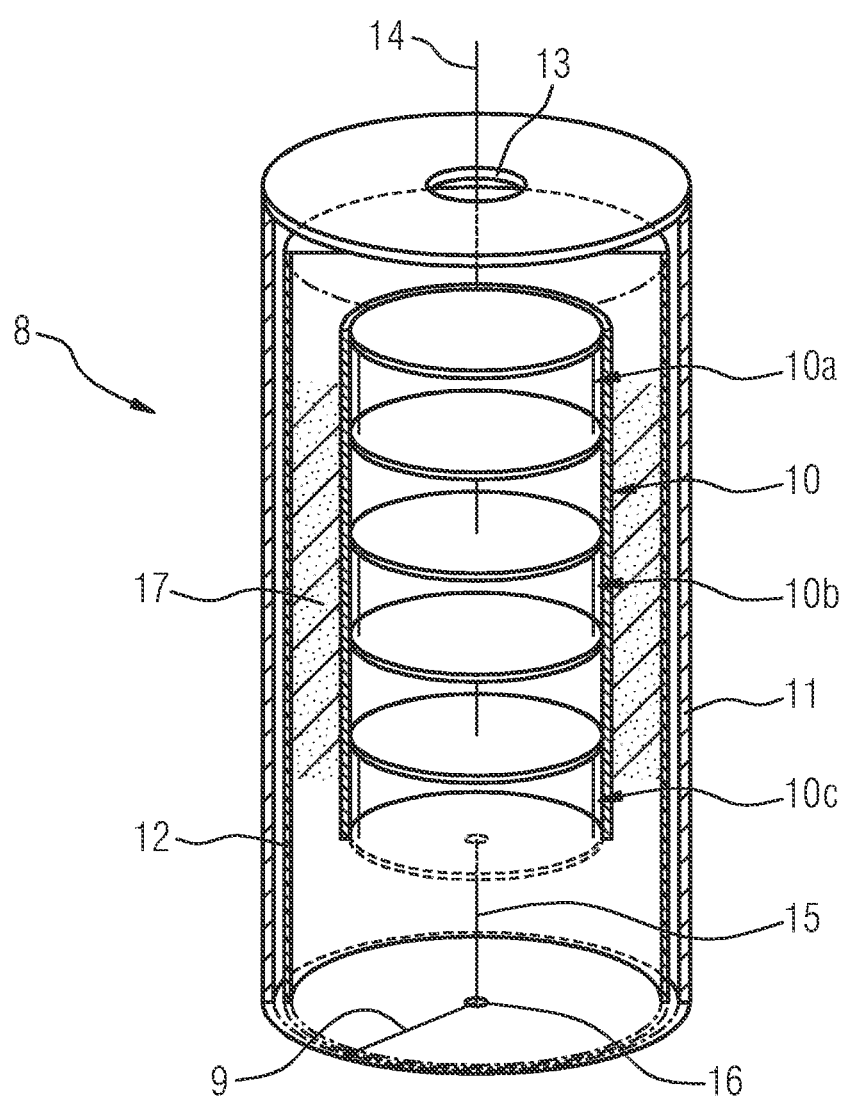
FIG. 2 is a diagrammatic illustration of a capacitor assembly according to the invention.

FIG. 2 illustrates a capacitor assembly 8 which can be used as the capacitor assembly C from FIG. 1. The capacitor assembly 8 contains an active capacitor part 10, which consists of three partial capacitors in the form of partial windings 10a, 10b, 10c, which are electrically connected to each other in a series circuit. The active capacitor part 10 is arranged in a metallic housing 11. The capacitor assembly 8 has a first external terminal 14, which is led through an opening 13 in the housing 11 by means of a high-voltage leadthrough. The capacitor assembly 8 also has a second external terminal 15, which contains a screw 16, by means of which the capacitor winding 10 is the electrically and mechanically connected to the housing 11.

The capacitor assembly 8 further contains an inlay 12 made of a metallized thin film of polypropylene. The inlay 12 has a cylindrical shape. In FIG. 2, a distance between the inlay 12 and the housing 11 can be seen for reasons of clarity. In actual fact, however, the inlay 12 is arranged to rest on the inner wall of the housing 11. By means of an electrical attachment 9, an electrical connection between the inlay 12 and the screw 16 and therefore also to the housing 11 is ensured.

An insulating medium 17 in the form of potting made of a resin encloses the active capacitor part 10 and fills the interspace between the active capacitor part 10 and the inlay 12. The inlay 12 is capable of bonding with the potting or the insulating medium 17. If, for example because of a temperature change, the potting compound shrinks in volume, then the inlay 12 matches the changed shape of the insulating medium 17, so that the dielectric properties of the capacitor assembly 8 are substantially maintained. The inlay 12 and the housing 11 are at the same electric potential, so that an interspace or air inclusion which may possibly be produced between the inlay 12 and the housing 11 is largely insignificant.

The invention claimed is:

1. A capacitor assembly for a high-voltage application, comprising:
    an active capacitor part;
    a housing for accommodating said active capacitor part;
    an insulating medium for insulating said active capacitor part; and
    a flexible-shape inlay disposed between said insulating medium and said housing and configured to at least partly separate said insulating medium from said housing, said flexible-shape inlay being connected electrically to said housing.

2. The capacitor assembly according to claim 1, wherein said housing and said inlay at least partly rest on each other.

3. The capacitor assembly according to claim 1, wherein said insulating medium contains a potting compound made of a resin.

4. The capacitor assembly according to claim 1, wherein said inlay has a thickness of less than 2 mm.

5. The capacitor assembly according to claim 1, wherein said inlay is conductive.

6. The capacitor assembly according to claim 1, further comprising an electrical attachment, said inlay is connected to said housing by means of said electrical attachment.

7. The capacitor assembly according to claim 6, wherein said electrical attachment has rivets, screws and/or an electric cable.

8. The capacitor assembly according to claim 1, wherein said active capacitor part contains a series circuit of partial capacitors.

9. The capacitor assembly according to claim 1, wherein the capacitor assembly has a voltage resistance of at least 1 KV insulation voltage.

10. The capacitor assembly according to claim 1, wherein said inlay is a metallically coated polypropylene film.

11. The capacitor assembly according to claim 1, wherein the capacitor assembly has a voltage resistance of at least 10 KV insulation voltage.

12. A converter assembly, comprising:
a series circuit of power semiconductors; and
said capacitor assembly according to claim 1 being disposed in an electric parallel branch to at least one of said power semiconductors.

13. A method for producing a capacitor assembly, which comprises the steps of:
disposing an inlay to rest on an inner wall of a housing and being electrically connected to the housing;
providing an active capacitor part inside the inlay; and
subsequently filling the housing with an electrically insulating potting compound to at least partially fill the interspace between the active capacitor part and the inlay, with the inlay at least partly separating the electrically insulating potting compound from the housing.

14. A capacitor assembly for a high-voltage application, comprising:
an active capacitor part;
a housing for accommodating said active capacitor part;
an insulating medium disposed outside said active capacitor part for insulating said active capacitor part; and
an inlay disposed between said insulating medium and said housing, distal from said active capacitor part, and configured to at least partly separate said insulating medium from said housing, said inlay connected electrically to said housing.

15. The capacitor assembly according to claim 14, wherein said insulating medium includes a potting compound made of a resin.

* * * * *

UNITED STATES PATENT AND TRADEMARK OFFICE
CERTIFICATE OF CORRECTION

PATENT NO. : 12,073,995 B2
APPLICATION NO. : 17/540618
DATED : August 27, 2024
INVENTOR(S) : Torsten Harald Simon et al.

It is certified that error appears in the above-identified patent and that said Letters Patent is hereby corrected as shown below:

In the Claims

Column 5, Claim 9, Lines 16-18 should read as follows:
9. The capacitor assembly according to claim 1, wherein the capacitor assembly has a voltage resistance of at least 1 kV insulation voltage.

Column 5, Claim 11, Lines 21-23 should read as follows:
11. The capacitor assembly according to claim 1, wherein the capacitor assembly has a voltage resistance of at least 10 kV insulation voltage.

Signed and Sealed this
Fifth Day of November, 2024

Katherine Kelly Vidal
*Director of the United States Patent and Trademark Office*